United States Patent
MacDonald

(12) 
(10) Patent No.: US 6,567,576 B2
(45) Date of Patent: May 20, 2003

(54) OPTICAL SWITCH MATRIX WITH FAILURE PROTECTION

(75) Inventor: Robert I. MacDonald, Manotick (CA)

(73) Assignee: JDS Uniphase Inc., Ottawa (CA)

( * ) Notice: Subject to any disclaimer, the term of this patent is extended or adjusted under 35 U.S.C. 154(b) by 0 days.

(21) Appl. No.: 09/775,505

(22) Filed: Feb. 5, 2001

(65) Prior Publication Data

US 2002/0136484 A1 Sep. 26, 2002

(51) Int. Cl.$^7$ ................................................. G02B 6/26
(52) U.S. Cl. ............................ 385/17; 385/27; 385/31; 359/10; 359/117
(58) Field of Search .............................. 385/17, 16, 18, 385/24, 31, 39; 359/110, 117, 124, 129, 126, 127, 128, 194, 218, 219, 220

(56) References Cited

U.S. PATENT DOCUMENTS

| | | | | |
|---|---|---|---|---|
| 5,457,556 A | * | 10/1995 | Shiragaki | 359/117 |
| 5,459,606 A | * | 10/1995 | Baranyai et al. | 359/109 |
| 5,805,320 A | * | 9/1998 | Kuroyanagi et al. | 359/117 |
| 6,115,517 A | * | 9/2000 | Shiragaki et al. | 359/128 |
| 6,233,072 B1 | * | 5/2001 | Liu et al. | 359/110 |
| 6,289,148 B1 | * | 9/2001 | Lin et al. | 385/24 |
| 6,307,653 B1 | * | 10/2001 | Bala et al. | 359/110 |
| 6,396,602 B1 | * | 5/2002 | Kaiser et al. | 359/110 |

OTHER PUBLICATIONS

"A Study of Non–Blocking Switching Networks" The Bell System Tchnical Journal, pp. 406–424 Clos, Mar. 1953.

* cited by examiner

Primary Examiner—Frank G. Font
Assistant Examiner—Kaveh C Kianni
(74) Attorney, Agent, or Firm—Neil Teitelbaum

(57) ABSTRACT

The present invention relates to a multi-stage non-blocking optical switch matrix having failure protection. The optical switch includes failure protection in the form of a capacity to provide an alternative route for any connection, including rearrangeable protection to provide alternative routes for multiple connections, as required, and to permit replacement of any failed submatrix module without service interruption. The present invention provides both internal and external protection from system failure in a multi-stage optical switch matrix by providing interconnected modules in a first external stage. The modules are interconnected by rerouting ports for redirecting signals from an input/output port on one external switch module to another external switch module. Protection is further provided through a center stage having a number of center stage switch modules, fully connected to the external modules, equal to twice the number of input/output ports and rerouting ports on an external module. With this structure, a failure at any point in the switch sub-matrices can be avoided, so that rearrangeable non-blocking performance can be obtained. In the case of a failure, a signal can be rerouted, additional signal paths can be rearranged, and faulty modules can be removed and replaced without affecting non-blocking switch performance.

7 Claims, 2 Drawing Sheets

OPTICAL SWITCH MATRIX WITH FAILURE PROTECTION

FIELD OF THE INVENTION

The present invention relates to a multi-stage non-blocking optical switch matrix having failure protection. In particular, the optical switch includes failure protection in the form of a capacity to provide an alternative route for any connection, including rearrangeable protection to provide alternative routes for multiple connections, as required, and to permit replacement of any failed submatrix module without service interruption.

BACKGROUND OF THE INVENTION

As optical telecommunication networks have evolved over the years and have become more complex, a need has arisen for a matrix switching system capable of optically coupling any one of a large number of fibres to another. Furthermore, it is desirable for the switching system to be "non-blocking", i.e. the switching of one input fibre to an output fibre should not interfere with the light transmission of any other input fibre to any other output fibre.

In an article entitled, "A Study of Non-Blocking Switching Networks", published in the March 1953 issue of The Bell System Technical Journal, Charles Clos explained the characteristics and advantages of multi-stage switching arrays. Today, Clos multi-stage electrical signal routers are widely known in the industry, and many commercially available routers are based upon Clos' initial design.

A Clos non-blocking optical switch matrix is a modularized non-blocking switch that can be configured from 1×n switches, or switches of other dimensions, in a multi-stage (3, 5, 7 . . . ) architecture including a centre stage between external input/output modules. Advantageously, this structure relies on smaller simpler switch elements, and requires fewer lens-to-fibre connections, reducing the costs of the switch matrix.

It is possible to provide an overconnected Clos network with one more center stage matrix than necessary for non-blocking functionality. Since the overconnected Clos network remains non-blocking with the complete failure of one center stage submatrix, replacement of a failed center stage matrix is always possible. Replacing a failed center stage matrix requires rerouting only those signals that pass through it. An overconnected Clos architecture embodies several forms of protection.

First, failures that occur in any single center stage submatrix can be accommodated by rerouting the signals that are affected, up to and including the loss of an entire submatrix.

Second, it is guaranteed that there are two possible routes from any input module to any output module. Most failures in an input/output stage that block a single route can thus be accommodated. With switched mirror crosspoint arrays, such failures would occur if a single mirror failed to actuate into either the reflective condition in which the signal route changes between rows or columns or into the "passthrough" condition where the signal remains in the row or column in which it entered the switch. When a switch fails to actuate into the passthrough condition, it forces a particular path for the signal involved. The desired path can always be completed but there is a small probability that one other signal may also need to be rerouted through the center stages. This is so-called rearrangeable protection. If a switch fails in an intermediate condition it blocks all paths for the signal involved. This state requires external protection.

An overconnected optical Clos network with 2M center stages is therefore internally protected against total failure of any single center stage submatrix and most failures on a single path in the input/output stage submatrices (modules). However, protection is still needed against failures in the external input/output stages. Furthermore, protection implies the ability to repair a damaged part without interrupting the functioning of the switch. To replace any failed external submatrix module will require interrupting all paths connected to it. The replacement must be carried out without service interruption.

SUMMARY OF THE INVENTION

It has now been found that both internal and external protection from system failure in a multi-stage optical switch matrix can be secured by providing interconnected modules in a first external stage. The modules are interconnected by rerouting ports for redirecting signals from an input/output port on one external switch module to another external switch module. Further protection can be provided through a center stage having a number of center stage switch modules, fully connected to the external modules, equal to twice the number of input/output ports and rerouting ports on an external module.

With this structure, a failure at any point in the switch sub-matrices can be avoided, so that strictly non-blocking performance can be obtained. In the case of a failure, a signal can be rerouted without rearrangement of other signal paths, and faulty modules can be removed and replaced without affecting non-blocking switch performance. To replace an external module requires the provision of alternate paths to reroute a specific number of input/output signals.

Accordingly, the present invention provides a multi-stage optical switch matrix having failure protection for switching P optical signals to a plurality of locations in a non-blocking manner, which matrix comprises a first external stage, at least one center stage and a second external stage, the first external stage being optically coupled to the second external stage through the at least one center stage. The first external stage has R interconnected external modules, where R=P/M. Each external module comprises M external input/output ports, at least one protection port having a protection switch optically coupled thereto, a plurality of redundancy switches, each optically coupled to one of the input/output ports, and a plurality of second ports for coupling input signals from the external module to a center stage or from coupling output signals from the center stage to the external module, wherein each protection switch is coupled to at least one redundancy switch of another external module of the external stage. Preferably, the at least one center stage has 2 (M+Z) modules where Z is the number of protection ports per one external module. Preferably and typically, each first external stage is functionally identical with each second external stage.

In accordance with the invention, there is provided a module for use in a switch matrix for switching P optical signals to a plurality of locations in a non-blocking manner, the matrix having a first external stage with R external modules, a center stage and a second external stage with R external modules, the module comprising M external input/output ports, at least one protection port having a protection switch optically coupled thereto, a plurality of redundancy switches, each optically coupled to one of the input/output ports, and a plurality of second ports for coupling input signals from the external module to a center stage or from coupling output signals from the center stage to the external module, wherein each protection switch is coupled to at least one redundancy switch of another external module of the external stage.

It is an advantage of the present invention that the switch matrix permits switch module replacement without interfering with the non-blocking switching capability of the system.

It is a further advantage that the present invention provides an efficient and cost effective switch matrix structure. The switch of the invention requires an overall size of (P+MZ)×(P+MZ), rather than the minimum P×P. An estimate of the cost by counting crosspoints, with (typically) Z=1, yields a cost increase roughly proportional to $1+(M/P)^2$, while the corresponding cost for one-to-one protection is greater by a factor of 2. Since M is always less than P, the structure in accordance with the present invention is always less expensive than a one-to-one protection.

BRIEF DESCRIPTION OF THE DRAWINGS

Exemplary embodiments of the invention will now be described in conjunction with the drawings, in which.

DETAILED DESCRIPTION OF PREFERRED EMBODIMENTS

The following symbols are used throughout the specification:

R—number of modules (submatrices) in a stage

M—number of input/output (external) ports in a module R,

P—total number of external signal ports carried by the matrix,

Z—number of protection ports per module,

Q—number of lines to each protection switch.

Figure 1:
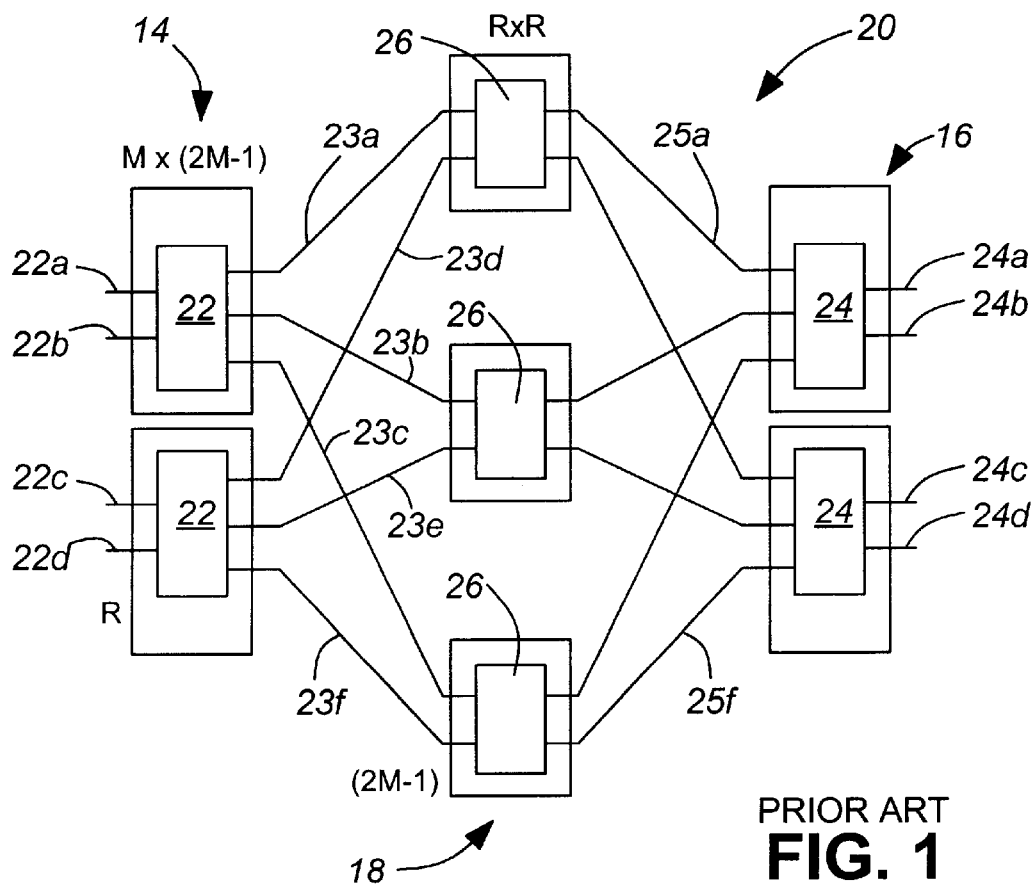
FIG. 1 is a prior art schematic diagram of a 4×4 Clos three stage matrix switch.

Referring now to FIG. 1, a non-blocking multistage matrix switch 20 is shown, illustrating a basic Clos design. The switch 20 has a first external stage 14 and a second external stage 16, identical to the first. External stages 14 and 16 are optically coupled through a center stage 18. External first ports 22a . . . 22d and 24a . . . 24d are grouped into R groups, of M ports (in this instance, R=2 and M=2), wherein each group forms one side of a submatrix of dimension M×(2M−1). The number R is defined as R=P/M, where P is the total number of cross-connects or possible signals carried by the switch matrix 20, and M is the number of input/output ports per external submatrix 22, 24. Conveniently, the submatrices are modularly constructed as external modules 22 and 24 and center stage modules 26. The other side of the submatrix (external module 22, 24) of dimension M×(2M−1) has second ports 23a . . . 23f and 25a . . . 25f which provide one connection to each of the 2M−1 (in this case 3) center submatrices or modules 26 of dimension R×R. The switch 20 is symmetrical about the R×R center matrices 26.

The Clos design exemplified by FIG. 1 is useful in reducing the number of cross points required to achieve a non-blocking matrix switch of a particular dimension.

Figure 2:
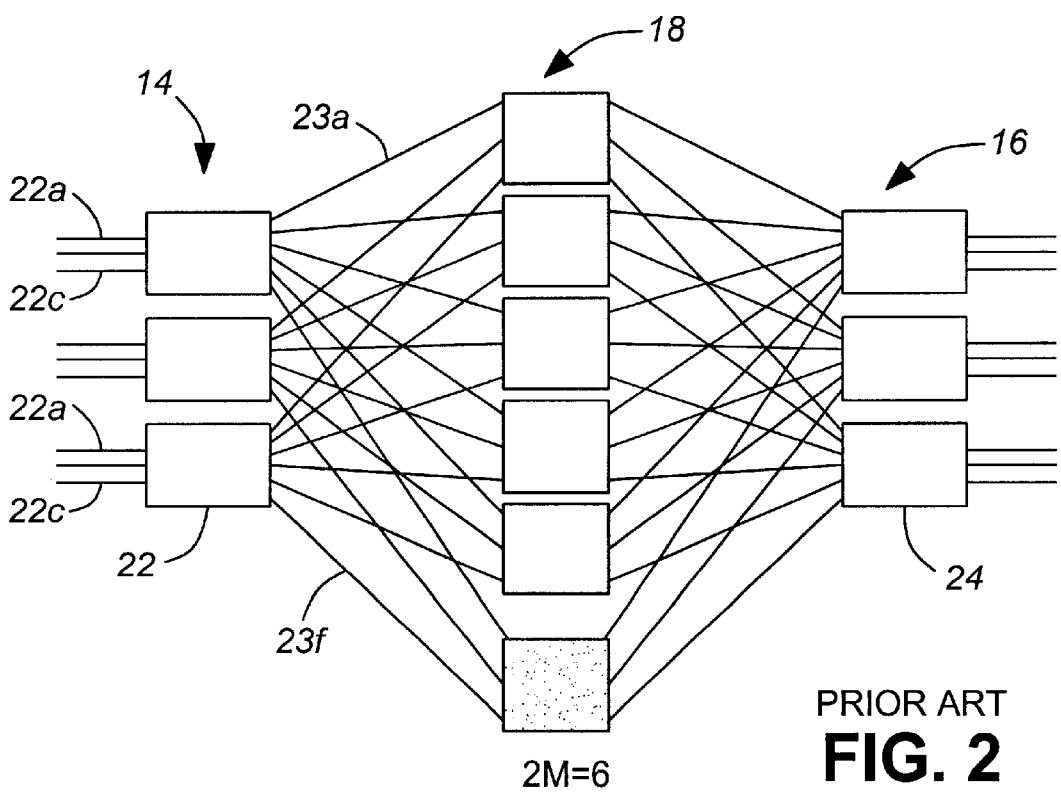
FIG. 2 is a schematic diagram of a prior art overconnected Clos three stage matrix switch having one more than the minimum number of center stage modules.

Turning now to FIG. 2 illustrating an overconnected Clos switch matrix, two external stages 14, 16 are optically coupled through a center stage 18 by selective switching. Each external module 22 has M input/output first ports (in this case 3) 22a . . . 22c and 2M second ports (in this case 6) 23a . . . 23f. The second ports 23a . . . 23f of the external modules 22 are selectively optically coupled to 2M center stage modules. The number of center stage modules 26 is equal to 2M, ie. one more module than necessary for non-blocking switch functionality. Since the overconnected Clos network remains non-blocking with the complete failure of one center stage submatrix, replacement of a failed center stage matrix is always possible. Replacing a failed center stage matrix requires rerouting all signals that pass through it. This number may be up to P/M where P is the overall number of ports in the crossconnect.

Figure 3:
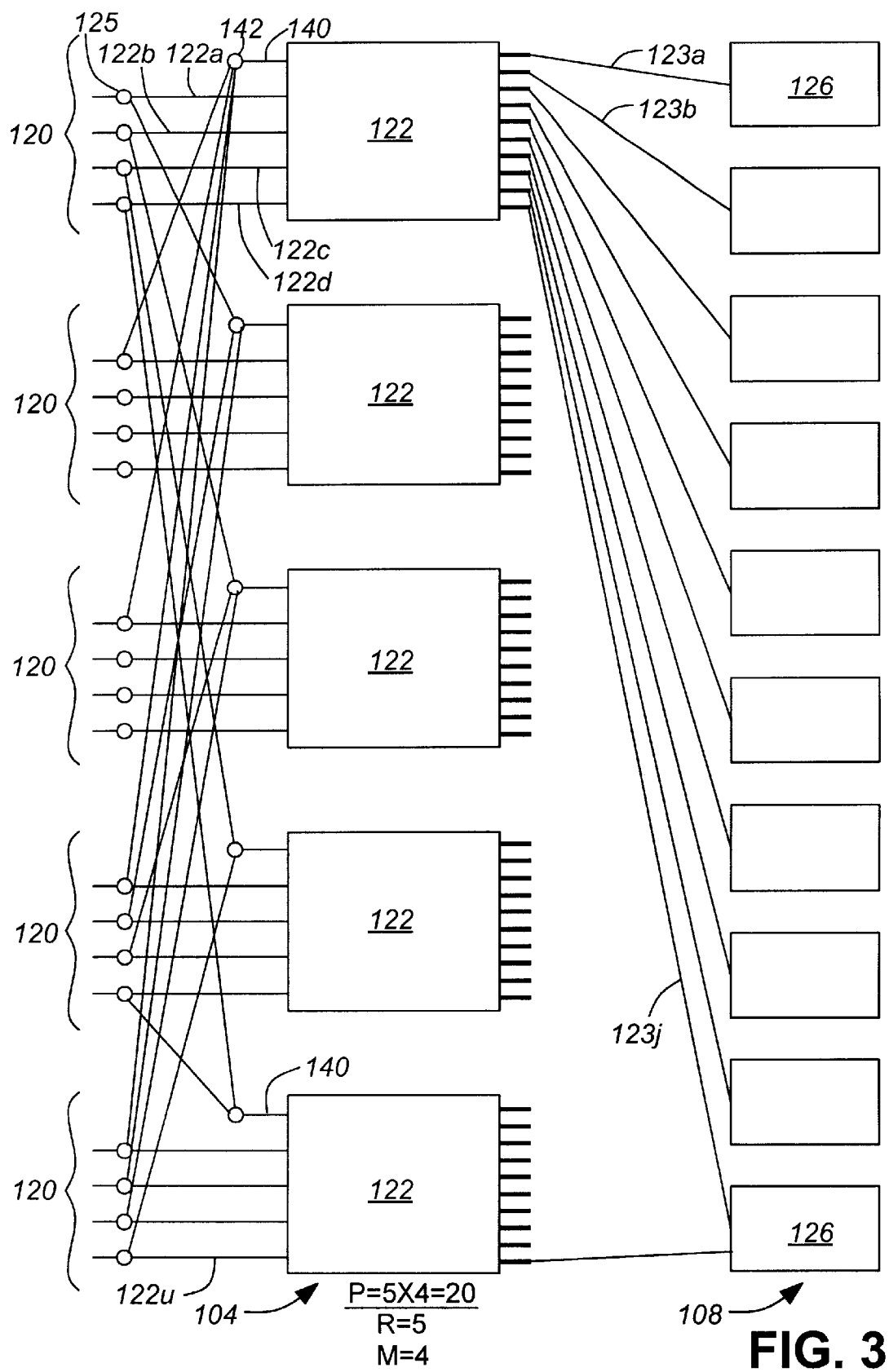
FIG. 3 is a partial schematic diagram of a multi-stage optical switch matrix in accordance with the present invention showing a single external stage in detail, coupled to an overconnected center stage, shown generally.

FIG. 3 shows a single external stage 104 in detail, coupled to an overconnected center stage 108, shown generally. The external stage has 5 (R=5) external modules 120, each module encompassing a crossconnect submatrix 122 having M=4 external input/output ports 122a–d and Z (in this case one) protection port 140 having a protection switch 142 which will be described below. The number Z of protection ports 140 and corresponding switches 142 may be greater than one per module. Each external module 120 is interconnected to at least one other external module 120 via the protection, or rerouting, port 140. To provide this interconnection, each input/output port 122a . . . 122d has a 1×n redundancy switch, in the specific case a 1×2 switch 125. Each redundancy switch 125 provides optical coupling of an input signal either to the respective external module 120 for switching to any second port 123a . . . 123j, or to a rerouting port 140 on another external module 120. In accordance with the Clos principle, the number of the second ports 123a . . . 123j is 10 which is 2(M+Z), M being 4 and Z being 1. Alternatively, a 1×n redundancy switch 125, where n is greater than 2, can couple a first port 122a . . . 122d to a rerouting port 140 on more than one other external module 122.

For clarity, the term "module" as applicable to the present invention and FIG. 3 encompasses the submatrix 122 with the input and output ports as well as the protection switches and the redundancy switches.

In the embodiment illustrated, the entire switch matrix has a dimension 20×20 (P×P), as the protection ports 140 do not serve as input nor output ports. It will also be noted that not all the connections between the switches 125 and 142 are illustrated. Also, only connections between the top input module 120 and the central stage modules 126 are indicated. It will be understood that all such connections are provided in the actual switch matrix.

In the input direction, from the left side of FIG. 1, each rerouting port 140 comprises an (R−1)×1 protection switch 142 for receiving and coupling a signal from one external module 120 into another external module 120 for switching to any second port 123a . . . 123j in an input direction. In an output direction, on the opposite side of the center stage 126, the rerouting ports (not shown) comprise each a 1×(R−1) protection switch which can redirect a signal from an external module to an output first port on another external module in a mirror-image configuration relative to the input side.

It can be seen that the protection switch 142 has a configuration Q×1 which is a function of the number of protection ports per external module 122. In the embodiment illustrated, where Z=1, Q=R−1 so that each module is interconnected with every other module at least once through a protection switch. If for example Z=2, then $$Q = \frac{R-1}{Z}$$

The center stage 108 comprises ten center stage modules 126 of R×R dimension. This number of center stage modules 126 is 2 (M+Z), i.e. equal to twice the number of input/output first ports 122a . . . 122d and rerouting ports 140 on an external module 122 for supporting an optical connection from each external stage module 122 to each center stage module 126. A second external stage (not shown) is symmetrical to the first external stage 104.

Further, it is understood that the switch matrix provides bi-directional switching capability. Each external first port 122a . . . 122n or location may launch or receive signals in either direction, independently of other external first ports 122a . . . 122n.

Preferably each stage 104, 108 is comprised of like modules or of functionally identical modules to simplify matrix construction and maintenance.

The module of the invention is suitable to be part of a known SKOL configuration, with the proviso that SKOL design does not have a center stage. The other features of the present invention apply mutatis mutandis.

It is an advantage of the switch matrix of the invention that any input signal may be rerouted to an alternative external module 122, and any output signal may similarly be rerouted via an alternative external module 126. Thus, an entire external module can be removed for replacement or repair without affecting non-blocking performanc e of the switch. A failure at any point in the switch external submatrices does not therefore cause a great problem.

Further advantage is provided due to the center stage having a number of modules equal to twice the number of input/output ports M plus the protection ports Z of a single external module.

As mentioned above, more than one protection port may be provided per external module. In such a case (Z>1), every other external module has at least one connection to one of the protection switches through a respective redundancy switch 125.

Generally, therefore, a protection switch of the invention has a configuration $$ceiling \frac{R-1}{Z} \times 1$$

where "ceiling" denotes an integer equal or greater than the fraction (R−1)/Z. If the number of modules/submatrices R is even, e.g. 6, then R−1 is an odd number, e.g. 5. If e.g. two protection switches per module are provided, then one of them would be coupled to three submatrices and the other one to two submatrices.

Of course, numerous other embodiments may be envisaged, without departing from the spirit and scope of the invention.

What is claimed is:

1. A multi-stage optical switch matrix having failure protection for switching P optical signals to a plurality of locations in a nun-blocking manner comprising:

a first external stage, at least one center stage and a second external stage, the first external stage optically coupled to the second external stage through the at least one center stage, with at least one connection between each module in the first and second external stages and center stage submatrices, the first external stage having R interconnected external modules, where R=P/M, each external module comprising M external input/output ports, at least one protection port having a protection switch optically coupled thereto, a plurality of redundancy switches, each optically coupled to one of the input/output ports, and a plurality of second ports for coupling input signals from the external module to a center state or for coupling output signals from the center stage to the external module, wherein each protection switch is coupled to at least one redundancy switch of another external module of the external stage, and wherein the at least one center stage comprises 2 (M+Z) submatrices where Z is the number of protection ports per one external module.

2. The matrix of claim 1 wherein each module of the first external stage is functionally identical with each module of the second external stage.

3. The matrix of claim 1 wherein the number of redundancy switches is M per module.

4. A multi-stage optical switch matrix having failure protection for switching P optical signals to a plurality of locations in a non-blocking manner comprising:

a first external stage, at least one center stage and a second external stage, the first external stage optically coupled to the second external stage through the at least one center stage, with at least one connection between each module in the first and second external stages and center stage submatrices, the first external stage having R interconnected external modules, where R=P/M, each external module comprising M external input/output ports, at least one protection port having a protection switch optically coupled thereto, a plurality of redundancy switches, each optically coupled to one of the input/output ports, and a plurality of second ports for coupling input signals from the external module to a center stage or for coupling output signals from the center stage to the external module, wherein each protection switch is coupled to at least one redundancy switch of another external module of the external stage, and wherein each redundancy switch is a 1×n switch, n being at least 2, that is optically coupled to an input port, one port of the submatrix of the module and a protection port of another external module.

5. A module for use in a switch matrix for switching P optical signals to a plurality of locations in a non-blocking manner, the module comprising M external input/output ports, Z protection ports having each a protection switch optically coupled thereto, where Z is at least one, a plurality of redundancy switches, each optically coupled to one of the input/output ports, and 2 (M+Z) second ports for coupling input signals to said plurality of locations, wherein each protection switch is coupled to at least one redundancy switch of another external module of the external stage.

6. The module of claim 5 wherein the number of redundancy switches is M per module.

7. The module of claim 5 wherein each protection switch has a configuration ceiling $$ceiling \frac{R-1}{Z} \times 1.$$

* * * * *